United States Patent [19]

Goldring

[11] 3,769,748

[45] Nov. 6, 1973

[54] PLANT WATERING DEVICE
[75] Inventor: John Elmer Goldring, Pebble Beach, Calif.
[73] Assignee: Argo International, Hayward, Calif.
[22] Filed: Mar. 27, 1972
[21] Appl. No.: 238,388

[52] U.S. Cl. .................. 47/38.1, 47/48.5, 116/118, 220/26, 220/93, 71/64 F
[51] Int. Cl. ......................................... A01g 27/00
[58] Field of Search .................... 47/38, 38.1, 38.10, 47/48.5; 116/118; 220/26, 93; 71/64 F

[56] References Cited
UNITED STATES PATENTS

| | | | |
|---|---|---|---|
| 3,058,263 | 10/1962 | Reynolds | 47/38.1 |
| 2,135,998 | 11/1938 | Beyer | 47/38.1 |
| 1,879,784 | 9/1932 | Benz | 47/38.1 |
| 1,342,786 | 6/1920 | White | 47/38.1 |
| 3,060,012 | 10/1962 | Pavek | 47/48.5 X |
| 3,409,165 | 11/1968 | Creith | 220/26 R |
| 3,474,931 | 10/1969 | Daniels et al. | 220/26 S |
| 2,246,490 | 6/1941 | Flues | 47/38 |
| 2,157,340 | 5/1939 | Jones | 47/38.1 |
| 2,072,172 | 3/1937 | Lockyer | 47/38.1 |

FOREIGN PATENTS OR APPLICATIONS

| | | | |
|---|---|---|---|
| 55,391 | 6/1890 | Germany | 47/38.10 |
| 1,200,457 | 7/1970 | Great Britain | 47/38.1 |

*Primary Examiner*—Edgar S. Burr
*Assistant Examiner*—Eugene H. Eickholt
*Attorney*—Harris Zimmerman

[57] ABSTRACT

A plant watering device for potted plants in which the pot is provided with one or more holes in its bottom wall. The device includes a reservoir for containing a supply of water and a phenolic foam pad disposed generally centrally of the reservoir with the upper surface of the pad positioned above the level of water in the reservoir and adapted to support the bottom wall of the pot.

The pad may be provided with plant nutrients, preferably in the nature of slow time release pellets.

In another embodiment, small phenolic foam plugs are provided to be inserted in a hole or holes in the bottom of the pot to insure water transfer between the pad and the soil or other grown medium in the pot.

10 Claims, 5 Drawing Figures

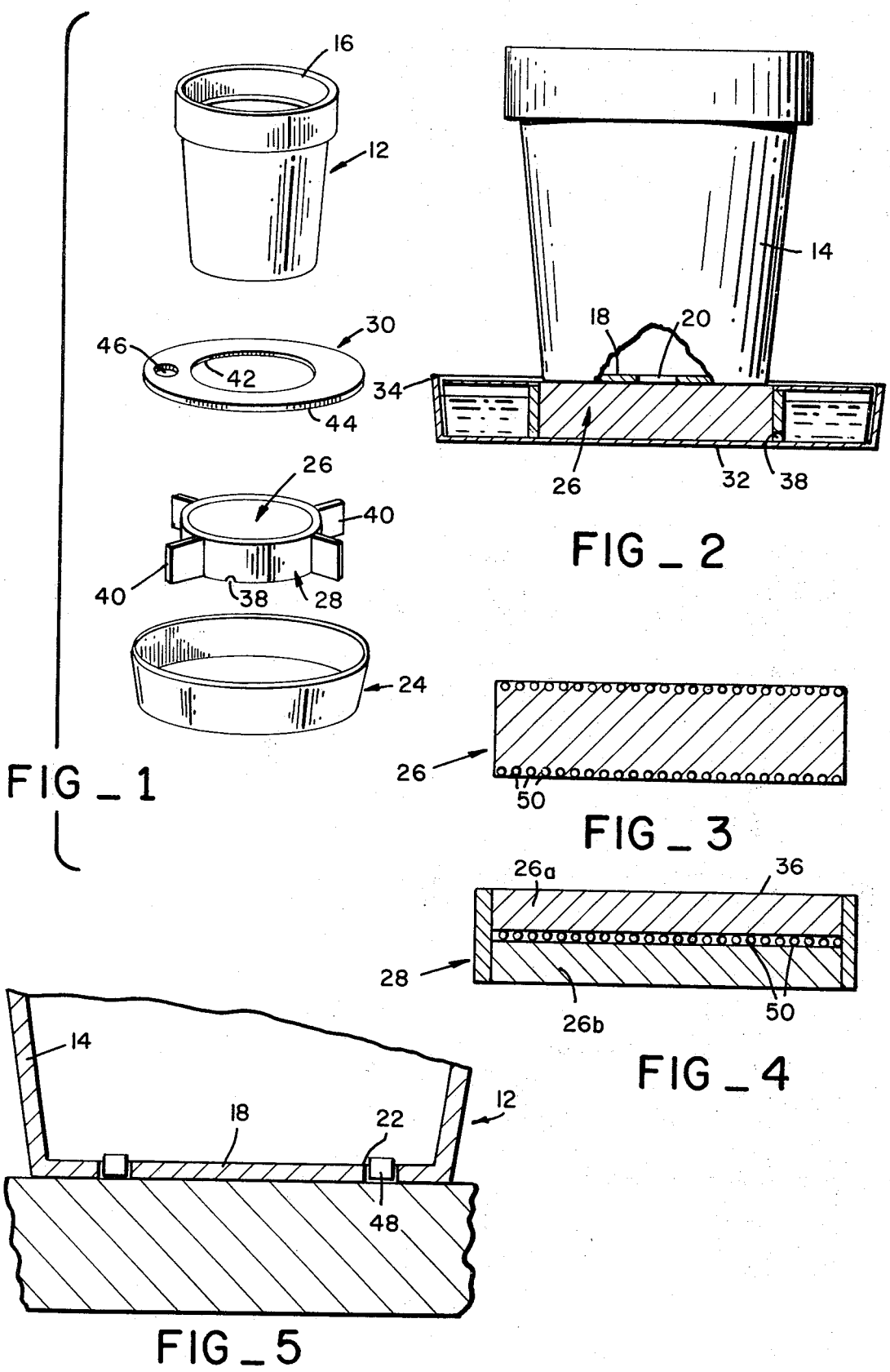

PLANT WATERING DEVICE

BACKGROUND OF THE INVENTION

There are numerous advantages derived from automatically supplying water, as well as plant nutrients, to a growing plant on a demand basis. Most amateurs tend to overwater plants, which is deleterious to plant health and survival, and it is obvious that underwatering, whether due to absence of the plant owner or by oversight, is similarly injurious to the plant.

It might also be explained that bottom watering of plants also has certain advantages, but if the plant is merely immersed in a reservoir of water, the roots and soil will become water logged and the chance of plant survival is remote.

It is accordingly an object of the present invention to provide a device for automatically supplying water to a plant growing in a conventional pot by merely placing the pot on the device.

Another object of the invention is to provide a device of the character described in which nutrients may be supplied to the plant along with the water, such nutrient being an integral part of the device, thereby eliminating the need for human monitoring or judgement as to when such nutrient is to be added to the plant.

A further object of the invention is to provide a device of the character described in which means are provided to insure adequate and proper water transfer from the device to the plant.

THE DRAWING

FIG. 1 is an exploded perspective view of the component parts of the device of the present invention;

FIG. 2 is a vertical cross-sectional view of the device with a pot positioned thereon;

FIG. 3 is a side elevational view of the foam pad with one arrangement of fertilizer pellets associated therewith;

FIG. 4 is a view similar to FIG. 3 but showing a modified arrangement of the pad and pellets; and FIG. 5 is a portional view similar to FIG. 2, but showing a different form of pot and illustrating foam plugs in the pot holes.

DESCRIPTION OF THE PREFERRED EMBODIMENT

As above stated, the device of the present invention is adapted to automatically supply water and nutrients to a conventional potted plant. For purpose of simplicity, no plant is illustrated in the pot 12, but as is well known, a conventional pot, whether formed of terra cotta or plastic, will include side walls 14, an open top 16, and a bottom wall 18. Most clay or terra cotta pots will have a single central drain hole 20 in wall 18 (as seen in FIG. 2), while many plastic pots will have a plurality of holes 22 in the bottom wall positioned adjacent the side walls. Soil or other growth material will normally be deposited within the pot and extend from the bottom wall 18 to adjacent the top 16.

In broad terms, the device of the present invention includes a water reservoir 24, a phenolic foam pad 26, a pad supporting ring 28, and a cover 30 overlying the otherwise exposed water in the reservoir.

Reservoir 24 is here shown as being of shallow bowl-like configuration, having a bottom wall 32 and upstanding side wall 34. The walls 32 and 34 define an open top chamber for receiving and storing a supply of water. The pad 26 is formed of expanded phenolic foam, or similar material which, after foaming or other production techniques is form retaining, capable of absorbing and holding a quantity of water far in excess of its own weight, and capable of supporting a potted plant when placed on the pad and transferring moisture from the pad to the growth material in the pot through holes 20 or 22. Thus, the pad 26 serves as a wick, since even though the level of water in the reservoir will be lower than the upper surface 36 of the pad, the latter, even if only a lower portion thereof is in engagement with the water, will absorb the water and effect a substantially uniform wetting thereof, including its upper exposed surface.

Pad 26 is preferably laterally supported by the annular ring 28 with the upper edge of the ring being generally coplanar with the upper surface of the pad. The lower portion of the ring may be provided with an apertured bottom wall (not shown) for further pad support, but in any event must provide some communication to the lower portion of the pad and the water in the reservoir, even when the water is almost depleted. As here illustrated, one or more openings 38 are provided on the ring adjacent its bottom. The foam pad should be fitted snugly within the ring.

Preferably, the ring and pad assembly should be centered in the reservoir, and any suitable centering means can be provided for this purpose. For example, the ring is here shown as being provided with radial wings 40 which engage the side walls 34 of the reservoir.

With the ring and pad centered in the reservoir and resting on the bottom wall thereof, the water in the reservoir will have an annular exposed surface of substantial extent. If exposed to the air, evaporation would require a more frequent refilling, and therefore, I prefer to cover the water in some suitable manner, such as cover 30 which may consist of a disc-like member having a central opening 42 surrounding ring 28 and an outer edge 44 extending to the side wall of the reservoir.

With the foregoing construction, it may be appreciated that with the device assembled, water may be poured into the reservoir, such as through an opening 46 in cover 30. The foam pad will absorb a significant quantity of water through bottom opening 38. When the pot 12 is placed on the pad, even though there may be a space between the upper surface 36 of the pad and the lower surface of the soil in the pot (such space constituting the thickness of pot wall 18) in most cases both the soil and the pad will serve as a wick, the soil drawing water from the pad as it requires the same. The pad, even though immersed in water (except for its upper surface) will never puddle or expose surface water.

Where the thickness of wall 18 is too great to permit water transfer, or if for other reasons there is not a proper water transfer between the soil and the pad, small plugs 48 of the same phenolic foam may be inserted in one or more holes to insure adequate water transfer.

Nutrient or fertilizer is transferred on a controlled basis with the water from the pad to the pot. Preferably, the nutrients are in the form of pellets 50 of controlled release fertilizer. An example of such pellets is OSMOCOTE, a registered trademark of Sierra Chemical Company, and the pellets' release time can extend over many months, even though in contact with the moistened foam material. The pellets 50 may be introduced into the pad during the foaming operation, or as shown in FIG. 3, mechanically deposited and pressed into one or both surfaces of the pad. In FIG. 4, the pad is formed of two cylindrical adjacent sections 26a and 26b with the pellets 50 depicted therebetween.

Although the device and system described above is particularly well suited for desirable bottom watering, if the plant is overwatered from above, excess water can drain out through the hole 20 or 22, through pad 26 and into the reservoir. Also, although only a single pot is shown in operative position on the device, a number of pots may be positioned thereon so long as a bottom hole in each of the pots overlies at least one upper surface portion of the pad.

Since the water in the reservoir will not be above the upper surface 36 of the pad, or in any event will not be above the bottom of the growth material in the pot, no puddling or soaking can take place. It might also be noted that if the wings 40 are eliminated, the cover 30 could surround the central pad and ring and float on the water in the reservoir. The cover would then serve the dual function of providing an evaporation barrier and serving as an indicator for the water level in the reservoir.

I claim:

1. A plant watering and feeding device for automatically transferring moisture and nutrients to a growth medium contained in a pot having an aperture adjacent the bottom thereof, said device comprising:
   a. a water reservoir having a bottom wall and a side wall extending upwardly from said bottom wall;
   b. a porous pad disposed in said reservoir, said pad comprising a central portion, and generally planar upper and lower surfaces respectively disposed on either side of said central portion and parallel to each other, said central portion being impregnated with plant nutrients, said upper surface defining a generally planar exposed pot-supporting platform disposed above the normal water level in said reservoir, said lower surface being in operative communication with said water adjacent said bottom wall of said reservoir, said pad being capable of absorbing and retaining a quantity of water in excess of its own dry weight, and further being form retaining and dimension stable in both dry and wet conditions when said pot is placed upon said platform;
   c. an annular reinforcing ring surrounding said pad, the upper edge of said ring being generally coplanar with said upper surface of said pad, and the lower portion of said ring being provided with an apertured bottom plate which is generally coplanar and coextensive with said bottom surface of said pad, said lower portion of said ring having at least one aperture therein to provide flow communication between said reservoir and said pad lower surface, said pad fitting snugly within said ring such that said pad and said ring are insertable and removable from said device as a unit;
   d. and means centering said pad and said ring as a unit in said reservoir, said means disposed both radially and annularly of a vertical common central axis of said pad and said ring and bearing none of the vertical weight load of said pad, ring or pot and growth medium;

said pad serving to absorb water from said reservoir so as to effect a substantially uniform wetting thereof, including its exposed upper platform, even though only a lower portion thereof is in flow communication with said water, by having water from said resevoir enter said pot by passing initially through said aperture and said pad lower surface, thence through said pad central portion and said nutrients, and, finally through said pad upper surface into said growth medium.

2. The device as set forth in claim 1 wherein said pad is formed of expanded phenolic foam.

3. The device set forth in claim 1 wherein said centering means comprises radial wings which engage said side wall of said reservoir.

4. The device set forth in claim 1 further including an annular cover member having a central opening surrounding said ring and an outer edge extending to said side wall of said reservoir.

5. The device set forth in claim 4 wherein said cover has a water-pouring opening therein.

6. The device set forth in claim 1 wherein said nutrients comprise a plurality of controlled-release pellets mechanically deposited and pressed into said pad central portion, said pellets being isolated from said growth medium by said pad upper surface and foam said water in said reservoir by said pad lower surface, said pellets being further disposed in a path of flow communication of said water from said reservoir between said aperture in said ring and said pad pot-supporting platform.

7. The device set forth in claim 2 further including plugs formed of expanded phenolic foam insertable in openings in the bottom of said pot to provide contact between said platform and said growth medium.

8. The device set forth in claim 1 further including means extending from adjacent said pad to adjacent said reservoir side wall and floatable in said water in said reservoir to define an evaporation barrier and water level indicator.

9. The device set forth in claim 6 wherein said pad central portion further comprises adjacent generally planar porous upper and lower cylindrical members disposed respectively on either side of and in tangential contact with said nutrient pellets, an upper surface of said upper cylindrical member defining said upper surface of said pad, and a lower surface of said lower cylindrical member defining said lower surface of said pad, a lower surface of said upper cylindrical member and an upper surface of said lower cylindrical member being in tangential contact with said nutrient pellets and defining a void thereinbetween wherein are disposed said nutrient pellets.

10. The device set forth in claim 1 wherein said bottom plate sits on and is in contact with said bottom wall of said reservoir.

* * * * *